United States Patent [19]

Sterzer

[11] 4,001,822
[45] Jan. 4, 1977

[54] ELECTRONIC LICENSE PLATE FOR MOTOR VEHICLES

[75] Inventor: Fred Sterzer, Princeton, N.J.

[73] Assignee: RCA Corporation, New York, N.Y.

[22] Filed: May 28, 1974

[21] Appl. No.: 473,765

[52] U.S. Cl. .................. 343/6.5 SS; 343/6.8 R; 343/713

[51] Int. Cl.² .................................. G01S 9/56

[58] Field of Search ...... 343/6.5 R, 6.5 LC, 6.5 SS, 343/6.8 R, 6.8 LC, 713

[56] References Cited

UNITED STATES PATENTS

| | | | |
|---|---|---|---|
| 3,521,280 | 7/1970 | Janco et al. | 343/6.5 SS |
| 3,839,717 | 10/1974 | Paul | 343/6.5 SS |
| 3,859,624 | 1/1975 | Kriofsky | 343/6.5 SS |
| 3,914,762 | 10/1975 | Klensch | 343/6.5 SS |

Primary Examiner—Maynard R. Wilbur
Assistant Examiner—S. C. Buczinski
Attorney, Agent, or Firm—E. J. Norton; J. Lazar; M. A. Lechter

[57] ABSTRACT

An electronic license tag or plate formed into a unitary structure and including a single antenna system cooperating in a system comprising a harmonic radiator which transmits a pulse coded identification signal in response to an interrogation signal, and in a signal communication path for detecting and decoding code modulations in the interrogation signal and deriving therefrom an information signal which is communicated to the operator of a vehicle to which the tag or plate is affixed.

11 Claims, 6 Drawing Figures

ELECTRONIC LICENSE PLATE FOR MOTOR VEHICLES

CROSS-REFERENCE TO RELATED APPLICATIONS

Of interest is the following copending application: Ser. No. 428,721 filed Dec. 27, 1973, entitled "Electronic Identification System," and based on the invention of Richard J. Klensch, and assigned to the same assignee as the present application.

BACKGROUND OF THE INVENTION

1. Field of the Invention

This invention relates to a license plate tag for use in an electronic vehicular identification and communication system.

2. Description of the Prior Art

With the ever increasing volume of traffic on public highways, highway accidents have become a serious problem. There are presently, over 16 million highway accidents every year, resulting in approximately 5 million personal injuries and about 55,000 fatalities. There is thus a need for electronic safety measures such as traffic control, collision avoidance, automatic braking and wayside communication systems.

Further, with the increased volume of traffic, a need has arisen for remote means to identify or to control fast moving vehicles. Indeed, high speed chases of fugitives by police are notably hazardous, not only to the occupants of the offending vehicle and pursuing officers but also to innocent bystanders. Thus there is a need for means by which the pursuing police vehicle can remotely identify the offending vehicle. Moreover, there is an apparent need for an inexpensive means of communication between a wayside station and passing vehicles to inform such vehicles of hazardous conditions, detours, speed zones, etc.

Cooperative harmonic radars detecting and ranging systems for automotive vehicles, such as that disclosed in U.S. Pat. No. 3,781,879 to Staras et al., issued Dec. 25, 1973 are particularly advantageous for collision avoidance and automatic braking system in that they are immune to blinding by transmitted signals from other radar equipped vehicles and to clutter caused by extraneous targets. However such cooperative systems must be widely, if not totally, utilized to be effective. Acceptance of a cooperative system, it appears, is dependent, in part, on the cost to the user or subscriber.

A harmonic detection and identification system is disclosed in copending application to Richard Klensch, Ser. No. 428,721, filed Dec. 27, 1973 providing for a transmitter continuously transmitting a beam of electromagnetic energy in a predetermined direction so as to impinge upon an indentification tag suitably attached to a participating vehicle. The identification tag derives a harmonic signal from the impinging beam and radiates a beam of energy back to the transmitter at the harmonic frequency which is pulse modulated in accordance with the preset identification codes. The receiver receives the reflected beams and generates signals representative of the code modulation.

SUMMARY OF THE INVENTION

The present invention provides for a communication system comprising one or more vehicles and an interrogation station remote from the vehicles for transmitting coded interrogation signals, each of the vehicles having a unitary license tag with electrical means receptive of the interrogation signals from the station. The electrical means includes a detector means for receiving the signals and detecting coded information in such signals.

DESCRIPTION OF THE PREFERRED EMBODIMENT

The present invention is concerned with an improvement in an identification tag of the type disclosed and claimed in the above-identified copending patent application, Ser. No. 428,721, filed by Richard Klensch on Dec. 27, 1973, entitled "Electronic Identification System." Briefly, the copending application of Klensch describes such a tag as used within an electronic vehicular detection and identification system wherein a microwave transmitter, such as at a stationary station, continuously transmits a beam of electromagnetic energy in a predetermined direction so as to impinge on an identification tag suitably positioned on and attached to passing objects such as vehicles. The identification tag derives a harmonic signal from the impinging beam and radiates a beam of energy, at the harmonic frequency, which is pulse modulated in accordance with a preset identification code. A receiver associated with the transmitter receives the radiated harmonic frequency beam and generates, by a detection process, signals representative of the code of modulation.

The present invention provides, for a participating vehicle, a multifunction license plate which integrally incorporates in a single, unified structure electronic components required for use in a cooperative harmonic radar ranging, detecting identification and communication system. The system serves to return automatically, a coded harmonic identification signal in response to an impinging interrogation or probing signal of a given frequency, and to provide a communications channel between the interrogating station and the participating vehicle.

Figure 1:
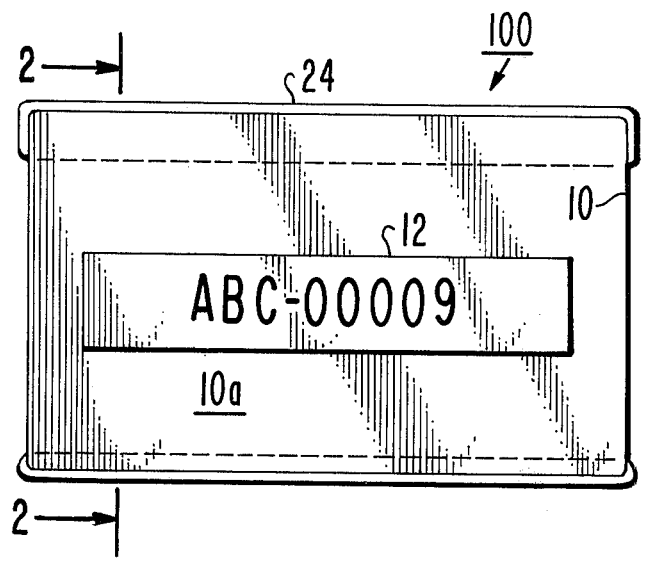
FIG. 1 is a front elevation view of a license plate in accordance with the present invention.
Figure 3:
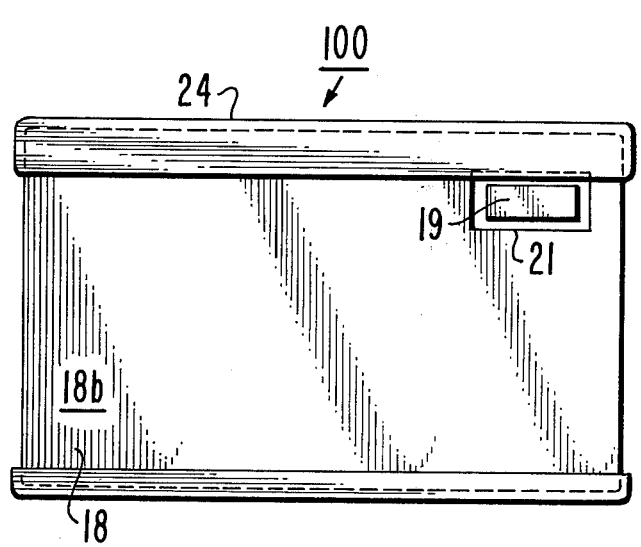
FIG. 3 is a rear elevation view of the license plate of FIG. 1.
Figure 2:
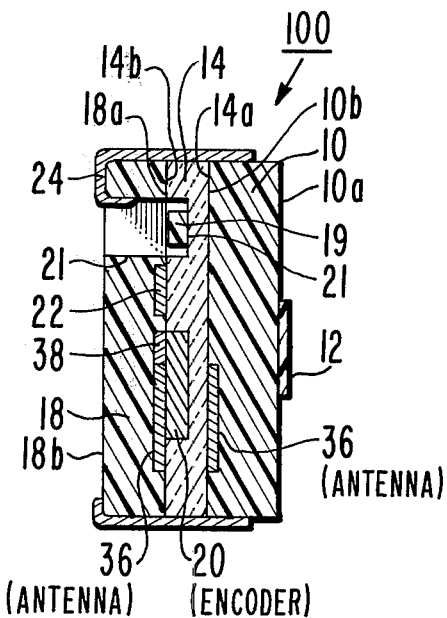
FIG. 2 is a sectional view in side elevation of the license plate of FIG. 1 as viewed along lines 2—2.

Referring now to the drawing, there is shown in FIGS. 1, 2 and 3 the structural arrangement and positioning of various electronic components of the system forming a license plate embodying one form of the present invention. The license plate 100 is formed generally of three planar members 10, 14, and 18, as shown in FIGS. 1 and 2, in particular. The first member 10 is generally planar, having an outer face 10a and an inner face 10b. The outer face 10a is provided with visible indicia 12 for appropriate license plate identification as shown in FIG. 1. The member 14 is provided with electronic means adapted to respond to interrogation signals and includes detector means for detecting coded information in such signals. The member 14, disposed adjacent the outer member 10, serves to support the antenna network 36, harmonic generator 38, signal detector 22 and a connector 19. Connector 19 is suitably disposed in a recess 21 in the structure as shown in the drawing. An integrated circuit chip 20 is mounted within the member 14 to provide the encoder function of the system, to be described hereinafter in greater detail in conjunction with FIG. 4. Member 14 thus serves as a substrate upon which the various components of the system are mounted, interconnected by suitable printed wiring or strip-line connections. The rear member 18 is substantially planar in form, corresponding to the front member 10, and serves to cover the middle member 14 and protect thereby particularly the antenna network 36. An opening or aperture 21 is provided in the member 18 to provide access to the inner member 14 to make therethrough external connections to it as by a cable and connector arrangement, comprising for the present embodiment a cable connector 30, a cable connector 32, and a cable connector 34, to be described in greater detail hereinafter with reference to FIG. 4.

The three structural members (10, 14 and 18) are assembled to form a single, unified, integral structure. The members are joined together in juxtaposed position by suitable bonding of an adhesive or other non-conducting mechanisms. Suitably an epoxy resin may be used for joining structures formed of compatible plastic. The members 10 and 18 may be formed such that either one or both provides a housing or enclosure for the others. Thus, the member 18 may be formed to provide a shell or housing for members 14 and 10. It should be understood that the manner of forming the integral, unified license plate in accordance with the invention may be done in any manner desired. Thus, the member 14 carrying or supporting the electronic components of the system for the license plate 100 may be encapsulated or covered in a single process step whereby an outer covering serving as members 10 and 18 are formed over the member 14. Other procedures will be apparent to those skilled in the art.

The assembly may be provided with a metallic coating 24 to serve as an electrical connection for ground to the vehicle when the plate 100 is mounted on the vehicle, the coating 24 being extended, for example, into the connector housing 21 to provide a convenient and accessible ground connection to the internal wiring of the plate 100. It is noted that the metallic coating 24 is preferably positioned along one peripheral portion of the plate as shown and is not indiscriminately applied to the periphery or other exterior surface portions such as to interfere with the operation of antenna network 36.

Before proceeding with a more detailed description of the electronic components of the system carried within plate 100, it should be appreciated that the license plate 100 carries or supports several of the components that operate within a cooperative system providing communication, detection and ranging functions. A description of the multi-function system will be made in conjunction with FIG. 5.

Figure 4:
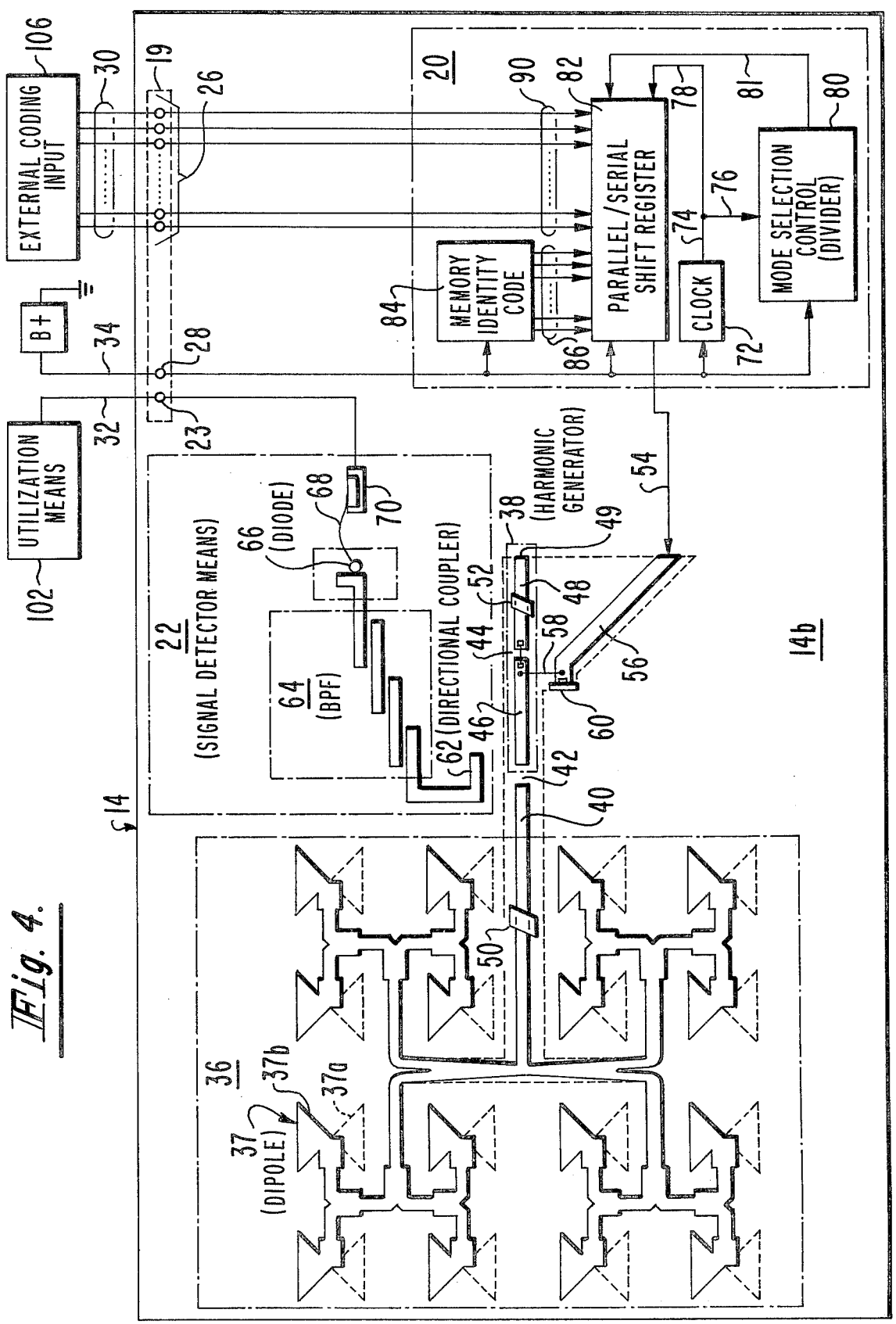
FIG. 4 is a schematic diagram of one component of the license plate of FIG. 1.

If reference is now made to FIG. 4, there is shown in more detail an illustration of member 14 of plate 100. As previously indicated member 14 is suitably formed of a dielectric board (substrate) having thereon a printed antenna network 36, harmonic generator 38, and signal detector 22. The dielectric board is suitably a double clad, laminated, plastic board 0.020 inches thick, 6 inches wide and 12 inches long. The antenna network 36, is arranged to operate at a predetermined frequency ($f$) and a chosen harmonic ($2f$). Antenna 36 is coupled to harmonic generator 38, which is formed of a passive nonlinear element, such as, for example, a zero bias Schottky barrier silicon diode 44.

Antenna 36 is suitably a flat, corporate network printed circuit antenna array of the type described in U.S. Pat. No. 3,587,110, comprising a plurality of dipoles 37 and a corporate feed 40, interconnecting the dipole elements. The antenna 36 is tuned to the geometric mean frequency between the predetermined fundamental frequency ($f$) and a chosen harmonic ($2f$) thereof. For example, if the fundamental frequency ($f$) is chosen to be 8.75 GHz (X-Band), and the chosen harmonic is the second harmonic ($2f$) thereof, namely, 17.5 GHz (Ku-band), the antenna dipoles 37 are ½ wavelength long at 12.4 GHz. One-half of the antenna pattern including one-half of each dipole ($37b$) is etched on one side ($14b$) of second member 14 (indicated by solid lines in FIG. 4); the other half of the antenna pattern including the other half of each dipole ($37a$) being etched on the opposite side ($14a$) of the board (indicated by dotted lines). A portion of the corporate feed structure 40 of antenna network 36 is coupled to harmonic generator 38, here a doubler circuit, by means of a capacitive gap 42 etched on the first half (surface $14b$) of the antenna circuit pattern. The remaining portion of the corporate feed structure is provided on the opposite surface $14a$ without a capacitive gap. Impedance matching is included in the corporate feed structure to match the antenna impedance to the doubler at the fundamental and second harmonic frequencies. To achieve a more unidirectional radiation pattern from the antenna 36, a back cavity and ground plane (not shown) may be incorporated into third member 18 behind the antenna.

The harmonic generator 38 is formed of a nonlinear element 44, suitably a Schottky barrier diode chip, disposed between an open circuit 50-ohm transmission line 46 and a short circuit 50-ohm transmission line 48 on surface $14b$. The lengths of the open circuit and short circuit lines are chosen so that the equivalent circuit of the transmission line and diode is resonant at both the fundamental and second harmonic frequencies. The resonant condition enhances the doubling efficiency at low microwave power levels. A matching stub 50 is placed 0.220 wavelengths at 8.75 GHz from the open circuit end at the gap 42 toward the antenna 36 to enhance the power coupled from the antenna to doubler at 8.75 GHz. Similarly, a reactive termination 52, suitably an open circuit 44-ohm stub, is placed on short circuit line 48 where the 17.5 GHz signal is near maximum, suitably 0.375 wavelengths from the short, to recover the harmonic signal at the antenna 28. It will be apparent to those skilled in the art that separate receiving and radiating antennas of similar or orthogonal polarization can be utilized instead of the single dual frequency antenna above described. Such a separate antenna system for orthogonal polarization is described in U.S. Pat. No. 3,781,879, mentioned above.

The member 14 also has etched thereon detector means 22 formed of a suitable directional coupler 62, a B.P. filter 64, a detector diode 66, and a low pass filter comprising an inductor 63 and capacitor 70. The detector means 22 is coupled to corporate feed 40 of antenna 36 through directional coupler 62. Directional coupler 62 is tuned to the fundamental frequency $f$, thus relaying to detector means 22 the fundamental frequency signals received by antenna 36 and effectively isolating detector means 22 from harmonic signals transmitted by the antenna. The fundamental frequency signals are routed from directional coupler 62 through bandpass filter 64 and therefrom to detector 66. Bandpass filter 64 is tuned to the fundamental frequency (f) and acts to isolate further the fundamental frequency signals from harmonic signals produced by harmonic generator 38. The output signals of detector diode 66 are passed through inductor 68, serving as an RF (radio frequency) choke and a 60 picofarad (60pf) capacitor chip 70 (serving as an rf bypass) to be applied to utilization means within the vehicle.

Member 14 is also provided with a suitable encoding means 20 to be described. Encoding means 20 is coupled, through conductor path 54, to a transmission line 56, which in turn is coupled through inductor 58, consisting of a 1 mil diameter wire, 0.140 inches long, serving as an RF range (radio frequency) choke, and a 60 pf capacitor chip 60 that serves as an rf bypass to the open circuit transmission line 46 of harmonic generator 38. The inductor 58 and capacitor 60 function as a low pass filter to pass d.c. coding pulses to control or bias the operation of diode 44.

The encoding means 20 for the present embodiment includes a conventional clock 72, suitably crystal osicllator, which provides continuous timing pulses over conductor 74 and, therefrom, over conductors 76 and 78, respectively, to a suitable mode selection control counter/divider 80 and a parallel/serial shift register 82. Shift register 82 is also receptive of a mode control signal from mode selection control means 80 over conductor 81, and is receptive (in parallel), through paths 86, of the contents of a suitable internal memory 84 containing a preset digital identification code corresponding to the license number of the vehicle, and through paths 90, an external code input from external code input terminals 26.

In operation of encoding means 20, mode control 80, in accordance with the clock pulses received from clock 72, supplies a control signal, e.g., logic one, to shift register 82, causing it to operate in a parallel load mode. Shift register 82 is loaded, in parallel, with the contents of internal memory 84 and the external code as applied to external code input terminal 26. The identification code from internal memory 84 is loaded into a first field of shift register 82 and the external code into a second field, by applying B+ voltage from source terminal 28 to specified member bits in accordance with the code word (e.g., to all logic zero bits). Ground is applied to the remainder bits, e.g., logic one bits.

At the end of a specified number of clock pulses, e.g., 30–40 pulses, mode control 80 is arranged to supply a second control signal, e.g., logic zero, causing shift register 82 to switch to a serial output mode, thereafter progressively advancing the loaded code to successive member bits in response to the clock signals from clock 72. The binary code (e.g., 30–40 bits) is applied, via conductor 54, transmission line 56 and RF choke 58 to harmonic generator 38 as an appropriate biasing voltage to inhibit the normally enabled generator 38 from generating second harmonic signals in accordance with the code. RF choke 58 also serves to block any RF signal leakage from antenna 36 to encoding means 20. Thus, encoder 20 serves to inhibit harmonic signal generation for certain of the periods (i.e., the zero bits of the code word) defined by clock 72 in accordance with the active code word contained in register 82.

After a sufficient number of clock pulses to advance the specified code length out of shift register 82, mode control 80 provide the parallel load control signal here a logic zero. Shift register 82 in response to the load signal is thereby reloaded with the code number preset in internal memory 84 and the instantaneous external code applied to external code input terminal 88 in the manner previously described.

The code word, it is noted, comprises an identity field, containing the preset identification code from internal memory 84, followed by a message field, containing an externally applied code, in turn, followed by an inactive or "no code" period equal to the length of time the shift register 82 is made to operate in the parallel load mode, typically a time period equal to the duration of the active code word.

The internal memory 84 and the external code input means 106 suitably provide for 32 active bits of a 64 bit code word, the remainder of the code word including 32 bits of "no code" time during which the shift registers (82) are loaded, and during which ranging can be accomplished as will be hereinafter explained.

Such an embodiment of encoding means 20 can be implemented for a 64 bit code word having 32 active bits utilizing two serially connected RCA CD 4004 COS-MOS 32-bit counters for mode control 80, and four serially connected RCA CD 4014 COS-MOS eight stage shift registers for shift register 82. Other forms of the encoder 20 are described in copending application Ser. No. 428,721, mentioned above.

Figure 5:
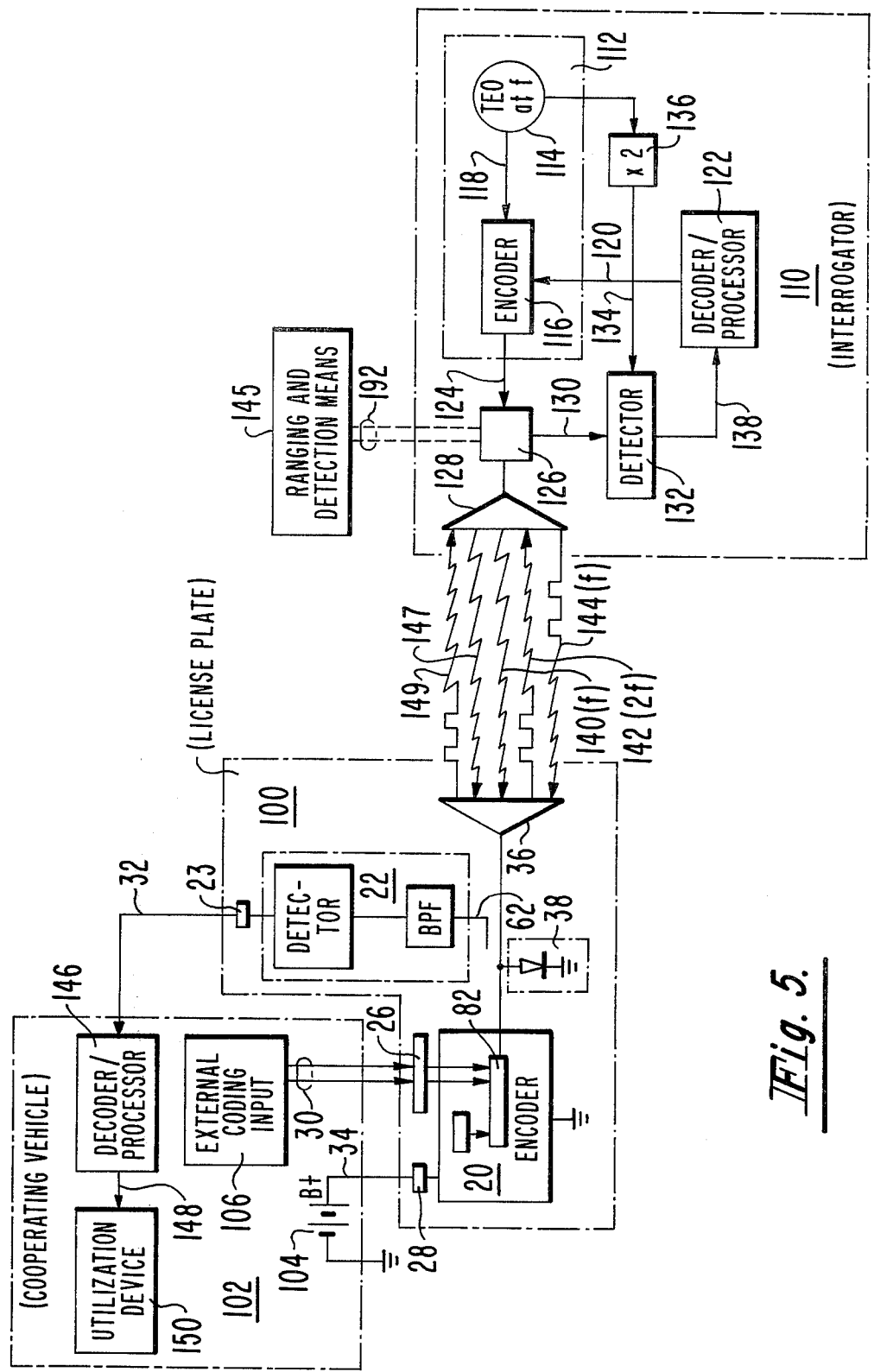
FIG. 5 is a schematic block diagram of a vehicular communications system including the license plate of the present invention.

To facilitate explanation of how the license plate 100 operates in a multi-function signalling system, reference is now made to FIG. 5. License plate 100, comprising antenna 36 and harmonic generator 38, encoder 20 and signal detecting means 22, is shown, in block diagram form, in cooperation with a subscribing vehicle 102 on which the plate 100 is mounted. D.C. power for the electrical components in license plate 100 is supplied from vehicle battery 104 over conductor 34 to the B+ input 28. Alternatively, a separate battery may be maintained internal to the tag. External message coding from the vehicle is supplied by external coding input means 106 over path 30 to external code input terminal 26 in plate 100 and therefrom to encoder 20. External coding input means 106 is suitably a receptacle for plug-in code modules, which connects the respective bits of the message field to either B+ or ground in accordance with a preset code message.

A remote interrogating station 110 comprises a transmitter 112 which is arranged to generate electromagnetic energy signals of a predetermined frequency (f), at relatively low power, of the order of 100 milliwatts by use of a negative resistance semiconductor device, such as TEO 114. TEO 114 may be coupled to filter means, (not shown) such as a low pass filter, to prevent spurious harmonics from being transmitted. Transmitter 112 also includes an encoder 166, which is receptive of the predetermined frequency signals (f) from TEO 114 over conductor 118 and code signals over a conductor 120 from a suitable decoder/processor 122 as will be explained. The encoded signals from encoder 116 are applied over conductor 124 to a diplexer 126 and therefrom to an antenna 128. Antenna 128 is suitably a flat, corporate network printed antenna system similar to antenna 36 (FIG. 3) of the plate 100. Diplexer 126 may, alternatively, be a tuned directional coupler and bandpass filter similar to those provided in the plate 100, namely the directional coupler 62 and bandpass filter 64 shown in FIG. 4. Diplexer 126 switches the antenna between transmit and receive modes and to route harmonic signals received by antenna 128 over a conductor 130 to a suitable detector 132 in a manner well known in the art. Detector 132 is also receptive of a reference signal applied over conductor 134 generated by multiplying the predetermined frequency signals from TEO 114 by the harmonic factor, 2, in the preferred embodiment, the frequency multiplier (X2) 136. Detected modulation output signals from detector 132 are applied over conductor 138 to decoder/processor 122.

In the overall operation of the system, encoder 116 is normally idle and the continuous wave signal from TEO 114 is passed to diplexer 126. Thus, a continuous wave signal at predetermined frequency $f$, generally indicated as beam 140, is transmitted by antenna 128. Antenna 128 is arranged to direct beam 140 in such a direction as to impinge upon the antenna network 36 of license plate 100. Antenna 36 radiates output signals from harmonic generator 38, generated in response to the impinging fundamental frequency signal 140, as a directional beam 142 of electromagnetic energy in a direction generally perpendicular to the plane of plate 100 and, therefor, in a direction to impinge on antenna 128 of interrogator 110. It should be noted that the output signal from the harmonic generator 38 is filtered by the resonant transmission lines 46 and 48 shown in FIG. 4 to attenuate substantially all but selected harmonic components, preferably the second harmonic. As previously explained, encoder 20 inhibits or enables harmonic generator 38 in accordance with the active code word loaded into shift register 82. Encoder 20 may be free running or triggered by illumination of the license plate 100 by signal 140 as described in detail in the above-identified copending application Ser. No. 428,712. Thus, the radiated second harmonic beam 142 is pulse modulated in accordance with a code word consisting of a field comprising the identification number of the tag, followed by a message field of external coding, in turn, followed by a "no code" field.

Second harmonic beam 142 is received by antenna 128 in station 110 and is therefrom routed by diplexer 126 to detector 132. Detector 132 passes the code modulation to decoder/processor 122, which suitably includes a decoder, such as that described in copending application Ser. no. 428,721, to decode and process the code modulation signals from the detector. Preferably, decoder/processor 122 will record the identification number of license plate 100 and effect prescribed functions in response to either the identification code or the external message coding. For instance, reception of a reply from a particular, predetermined vehicle will trigger transmission of a preset message code from the interrogator 110 to the vehicle plate 100. More specifically, upon reception of a preset code, decoder/processor 122 applies over conductor 120, a preset code message to encoder 116, which in accordance therewith pulse codes the fundamental frequency signal from TEO 114. The pulse coded fundamental frequency signal is transmitted by antenna 128 in a beam generally indicated as 144, again, in a direction so as to impinge upon the license plate 100. The pulse modulated beam 144 is received by antenna 36 in the plate 100 and is coupled to signal detector means 22 through directional coupler 62. The detected code signal is passed from detector means 22 to signal output terminal 23 and therefrom to a decoder/processor 146 situated in the vehicle 102 remote from plate 100. Decoder/processor 146 functions to apply over conductor 148, control signals in accordance with the coded message from interrogator station 110 to a utilization device 150, suitably including a panel of indicator lights and vehicle control mechanisms, as will be hereinafter explained.

In response to coded signal beam 144, harmonic generator 38 generates and thereby causes to radiate, a second harmonic signal from antenna 36. However, it should be noted, harmonic generator 38 is enabled only when a fundamental frequency signal is received by antenna 36, and hence generates no harmonic signals during the zero, or no signal, periods of the pulse code on beam 144. Thus, the signal radiated by antenna 36 in response to pulse coded fundamental frequency beam 144 bears an erroneous code word which, if not otherwise provided for, is received by antenna 128 in station 110, detected and applied to decoder/processor 122. Accordingly, diplexer 126 blocks signals received at antenna 128 when a modulated fundamental frequency signal is being transmitted Alternatively, decoder/processor 122, may be programmed if desired to ignore signals, as by suitable inhibit logic, received during those time periods an encoded fundamental frequency beam is being transmitted.

Thus, the present invention provides for a relatively simple means for communicating with a particular interrogated vehicle from an interrogating station. Decoder/processor 122 may be programmed also for communication to all interrogated vehicles of general code words indicative of, for example, hazardous conditions, detours, speed zones, etc. Decoder 146 in the vehicle 102 responds to such general code signals by applying appropriate control signals to the light panel of utilization device 150, causing appropriate indicia to be illuminated. Similarly, as described above, decoder/processor 122 and station 110 can be programmed to send a particular code message to a single specified vehicle or any specified group of vehicles. For instance, a specified vehicle could be requested, via a coded interrogation, to stop and check in at the station.

It should be noted that license plate 100 also provides a harmonic target, generally indicated as 16 and comprising antenna 36 and harmonic generator 38, for use with suitable harmonic radar ranging and detection means 145. Ranging means 145 may be incorporated into interrogator 110 by substituting a suitable multiplexer for diplexer 126 and connecting ranging means 145 thereto over conductors 192. The ranging means 145 typically is operated at frequencies offset from those used for communication and identification. Alternatively, ranging means 145 may include its own antenna and operate independently of interrogator 110.

The ranging function may be implemented in any compatible manner known in the art, such as the system disclosed in the previously-mentioned U.S. Pat. No. 3,781,879 issued to H. Staras et al. on Dec. 25, 1973. In brief, that radar ranging system provides for range determination by transmitting a continuous wave frequency modulated signal from an interrogating vehicle, as by antenna 128. The frequency modulated signal, generally indicated in FIG. 5 and 147, is directed so as to impinge upon antenna 36 in license plate 100. Harmonic generator 138 is activated by the impinging modulated signal 147 and accordingly generates a coded signal at the harmonic of the instantaneous frequency of the frequency modulation signal 147. It should be noted that the composition of the code word, in particular the presence of the no-code" field, assures that the code modulation will not significantly interfere with the ranging process. Accordingly, antenna 36 radiates a pulse coded frequency modulated harmonic beam 149 which is received at interrogating antenna 128 in interrogator 110 and routed by multiplexer 126 over conductors 192 to ranging means 145. The return signal 149, is compared with a sample of the transmitted signal 147, suitably multiplied corresponding to the harmonic return, to determine the difference in frequency and therefrom determine range. A more detailed description of the radar ranging system may be found in the aforementioned Staras et al. patent as well as an article published in the IEEE Spectrum, Volume 10, No. 5, May 1973, authored by J. Shefer and R. J. Klensch, entitled "Harmonic Radar Helps Autos Avoid Collisions."

It will be understood that although the system as described makes no provision for polarized signals between the interrogator antenna 128 and the harmonic target 16 in license plate 100, antenna network 36 and antenna network 28 may both comprise antenna arrays having orthogonal polarization, such as described in the above-mentioned patent to Staras et al. Thus, for such as system the frequency modulated interrogation signal 147 would be transmitted with a given polarization and received by an antenna array in antenna network 36 having a corresponding polarization. The harmonic return signal 149 would be transmitted by an array orthogonal to the receiving array thus imparting to it an orthogonal polarization. The interrogating antenna network 128 would also be arranged to receive only signals having such a polarization. Thus, an added discriminant is provided for the system to reduce clutter from extraneous targets and blinding by transmitted signals from other radar equipment vehicles.

It should be further appreciated that the encoded reply signals may be transmitted at the fundamental (i.e., the first harmonic) frequency of the interrogation signals in environments where clutter is not excessive. The preferred embodiment described above for developing encoded reply signals at the second harmonic of the fundamental frequency of the interrogation signals, would be modified to provide for first harmonic reply signals by suitable design of the antennae and transmission lines.

Figure 6:
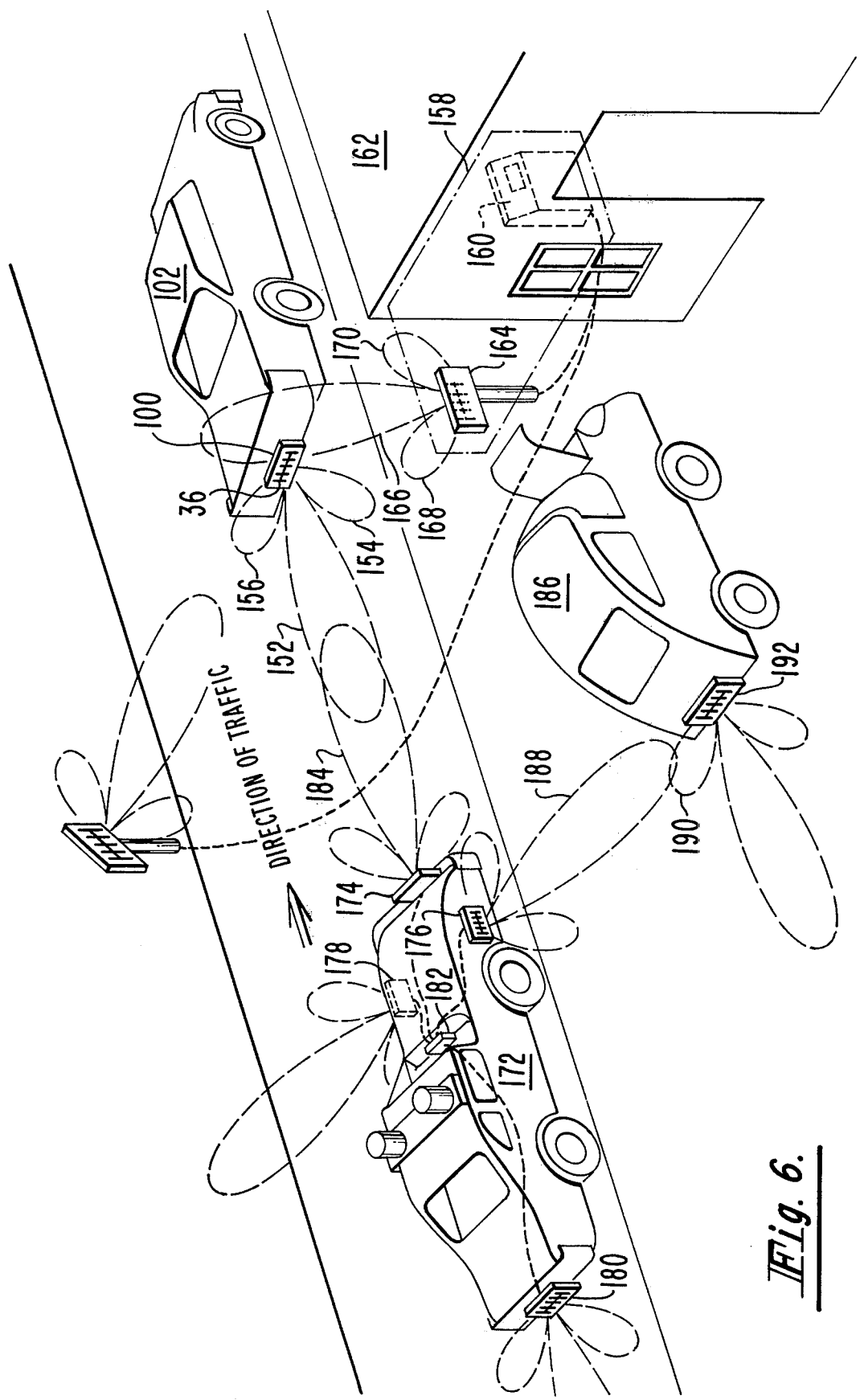
FIG. 6 is a pictorial illustration of the communication system of FIG. 5.

Referring now to FIG. 6 there is shown a pictorial diagram illustrating a vehicular communication system in accordance with the present invention. Vehicle 102 has fixed to its rear end, a license plate 100. Antenna 36 in the plate 100 is arranged to form a highly directional radiation or response pattern generally indicated in FIG. 6 as a main lobe 152 and first and second side lobes 154 and 156 respectively. FIG. 6 also shows a wayside station 158 similar to interrogating station 110 of FIG. 3 except that it utilizes a central decoder/processor 160 for a plurality of interrogating units, one for each lane of traffic. It should be apparent that portable wayside stations can be utilized for traffic control or evaluation purposes as desired. Central data processor 160 is located in a suitable enclosure such as nearby building 162 where it is readily accessible for maintenance and operational adjustments such as programming. Wayside station 158 includes an antenna 164, also having a specifically defined highly directional radiation pattern, generally indicated as main lobe 166 and side lobes 168 and 170. The main lobe 166 of station antenna 164 is directed to be parallel with the direction of first side lobe 154 of license plate antenna 36. Thus, while license plate 100 is in a plane substantially perpendicular to the direction of travel and maintains a radiation pattern, main lobe 152, substantially in the direction of travel, thereby making the license tag compatible with harmonic radar detecting and ranging systems such as that disclosed in the previously-mentioned U.S. Pat. No. 3,781,879, and for inter-vehicular communication, the radiation pattern side lobes 154 provide for communication between the vehicle and a wayside station.

The average single-line width of a typical roadway is in the order of 12 to 14 feet. To avoid interlane interference wayside station 158 utilizes typically 25db-gain antennas radiating 6.4 microwatts of power, thereby maintaining a miximum range in the order of 12 feet. Thus, each antenna associated with wayside station 158 communicates only with those vehicles passing through its associated lane, without interference to adjacent more distant lanes.

To illustrate inter-vehicular communication use of the invention reference is made to a police vehicle 172 (FIG. 6). Attached to the front, sides and rear of police car 172, respectively, are antennas 174, 176, 178 and 180 which are selectively connected to an interrogator unit 182 within the cab of the vehicle. Antenna 174 affixed to the front end of vehicle 172, provides a main lobe in substantially the direction to forward travel of the vehicle. Similarly, antennas 176 and 178 respectively provide main lobes perpendicular to the right and perpendicular to the left of the direction forward travel. Antenna 180 provides main lobe to the rear, i.e., 180°, from the direction forward travel.

Interrogator 182 in police vehicle 172 suitably utilizes a more powerful signal generator than that of wayside station 158, radiating 100 milliwatts of power, to maintain a signal transmission range in the order of 100 meters. Antenna 174 provides for identification of and signal communication with preceding vehicles, e.g., vehicle 102 in FIG. 6.

Antenna 176, on the right side of police vehicle 172, enables communication between police car and a disabled vehicle, such as disabled vehicle 186 shown in FIG. 4. The operator of disabled vehicle 186, upon the disabling occurrence would plug into internal coding means 106 (FIG. 3) and appropriate code module, indicative of the problem, e.g., out-of-gas, flat-tire, mechanical breakdown, etc. The operator of the police vehicle, upon viewing the vehicle 186 on the side of the road, would cause to be transmitted a fundamental frequency continuous wave interrogation signal from antenna 176. If a disabled vehicle was on the left side of the roadway, a signal would be tramsmitted from antenna 178 on the left of the car, the 100 meter range indicated above being sufficient usually to communicate with such vehicles. As police car 172 passes disabled vehicle 186, the main lobe 188 of antenna 176 overlaps the side lobe 190 of the license tag 192 of vehicle 186. The fundamental frequency signal, i.e., main lobe 188, upon receipt by vehicle 186 initiates a pulse coded harmonic frequency return signal from license tag 192, identifying the vehicle 186 and specifying by the coded reply the disabling problem. The harmonic signal is communicated by side lobe 190 of antenna 192 to antenna 176 through main lobe 188 and therefrom to the interrogation unit 182. The operators of police car 172 could then take appropriate action, such as radioing by conventional communication equipment for a service truck.

A decoder, such as described in the above-identified copending application Ser. No. 428,721 provides for two consecutive identical receptions of a code modulation to assure an accurate decoding of the code word, and consequently the bit rate of the code. In such a system adapted for use in the present invention, clock 72 in encoder 20 (FIG. 4), is arranged preferably such that the minimum of three radiated replies will be generated during the time interval that the radiation pattern lobes of the interrogating station and license plate interact.

It should be apparent from the foregoing description that the present invention provides a multifunction electronic license plate for operation in a cooperative vehicular signalling system. It will be understood that the above description is of illustrative embodiments of the present invention and that the invention is not limited to a specific form shown. Modifications may be made of the design and arrangement of the elements without departing from the spirit of the invention.

What is claimed is:

1. A unitary license tag for mounting on a vehicle for use in a cooperative signalling system of the type wherein an interrogating station remote from said vehicle directs interrogation signals to said tag, and in response thereto said tag transmits reply signals to said interrogation station, the improvement comprising:
    a. a first generally planar member of said tag having first and second opposing faces, said first member being formed of an electrically non-conductive material and having indicia visually displayed on said first face thereof;
    b. a second generally planar member having first and second opposing faces, said second member first face being disposed in parallel with and adjacent to said first member second face, said second member being formed of a dielectric substrate for supporting electronic means receptive of said interrogation signals for generating said reply signal;
    c. a third generally planar member having first and second opposing faces, said third member first face being disposed in parallel with said second member second face, said third member being formed of non-conducting material;
    d. means for bonding said first, second and third members together in juxtaposed relation forming thereby a single unitary structure adapted for mounting of said vehicle;
    e. said electronic means including,
        e1. an antenna network disposed on opposing portions of said second member first and second faces,
        e2. encoder means, attached to another portion of one face of said second member, for encoding said reply signals with coded information,
        e3. a first transmission line, disposed on another portion of said one face of said second member, coupled to said antenna,
        e4. a non-linear device, coupled to said transmission line and receptive of signals received by said antenna, for generating said reply signals at a harmonic frequency of the frequency of said received signals,
        e5. means for coupling said encoder means to said first transmission line, and
        e6. detector means receptive of said interrogation signals for detecting coded information included in said interrogation signals.

2. A tag according to claim 1 wherein the frequency of said reply signals is the first harmonic of the frequency of said interrogation signal.

3. A tag according to claim 1 wherein the frequency of said reply signals is the second harmonic of the frequency of said interrogation signal.

4. A tag according to claim 1 wherein said encoder means further includes a preset memory and encodes said reply signals in accordance with coded information corresponding to the preset contents of said memory.

5. A tag according to claim 4 further including detachable connector means for electrically coupling said electrical means to utilization devices on said vehicle.

6. A tag according to claim 5 wherein said connector means includes an information path from said vehicle to said encoder means for conducting information signals from information input means in said vehicle located at a position remote from said tag, said information means generating information signals in accordance with any one of a plurality of manually selectable coded messages, said encoder means further encoding said reply signal with said selectable coded messages from said vehicle.

7. A tag according to claim 5 wherein said connector means further includes an information path from said detector means to indicator means in said vehicle remote from said tag for decoding and displaying said information from said tag corresponding to said coded information included in said interrogation signals.

8. A tag according to claim 1 wherein said tag includes an electrical connection between said electrical means and an electrical power source on said vehicle remote from said tag for said encoder means.

9. A tag according to claim 1 further including an electrical power source for said electrical means mounted in said tag for said encoder means.

10. A tag according to claim 1 wherein said detecting means include a diode in a second transmission line, said second transmission line including a directional coupler coupled to said antenna for receiving interrogation signals and detecting coded information in said interrogation signals.

11. A system for communicating information between a remote station and a vehicle comprising:
    means, in said remote station, for transmitting coded interrogation signals to said vehicle and for receiving coded reply signals from said vehicle; and
    a unitary license tag, affixed to said vehicle, said tag including:
    an antenna network, for receiving said interrogation signal and transmitting said reply signal,
    a first transmission line coupled to said antenna network,
    a non-linear device, coupled to said first transmission line and responsive to said interrogation signal and control signals applied thereto, for generating a signal at a harmonic frequency of said interrogation signal, said harmonic signal being transmitted by said antenna network as said reply signal,
    encoder means, coupled to said non-linear device, for generating said control signals to said non-linear device, in accordance with a preset code, whereby said harmonic signal is modulated in accordance with said preset code, a second transmission line, directionally coupled to said first transmission line, and a diode, coupled to said second transmission line and responsive to said interrogation signal, for detecting the coding of said interrogation signal.

* * * * *

UNITED STATES PATENT OFFICE
CERTIFICATE OF CORRECTION

PATENT NO. : 4,001,822

DATED : January 4, 1977

INVENTOR(S) : Fred Sterzer

It is certified that error appears in the above-identified patent and that said Letters Patent are hereby corrected as shown below:

Column 1, line 43, "system" should be --systems--
Column 4, line 64, "63" should be --68--
Column 5, lines 26 and 27, "crystal osicllator" should be --a crystal oscillator--
Column 6, line 5, "provide" should be --provides--
Column 6, line 59, "166" should be --116--
Column 7, line 11, "the" should be --by--
Column 8, line 24, no period after "transmitter"
Column 8, line 66, "and" should be --as--
Column 9, line 5, " no-code"" should read --"no-code"--
Column 10, line 17, "single-line" should be --single-lane--
Column 10, line 21, "miximum" should be --maximum--
Column 10, line 33, "to" should be --of--
Column 10, line 38, "direction forward" should be --direction of forward--
Column 10, line 58, "tramsmitted" should be --transmitted--
Column 11, line 55, "of" should be --on--

Signed and Sealed this

Twenty-ninth Day of March 1977

[SEAL]

Attest:

RUTH C. MASON
Attesting Officer

C. MARSHALL DANN
Commissioner of Patents and Trademarks